(12) United States Patent
Hamid et al.

(10) Patent No.: US 12,513,497 B2
(45) Date of Patent: *Dec. 30, 2025

(54) CHARGING FUNCTION FALLBACK

(71) Applicant: T-Mobile USA, Inc., Bellevue, WA (US)

(72) Inventors: Saad Hamid, Bellevue, WA (US); Kashif Nadeem, Bellevue, WA (US); Nitin Bhakri, Sammamish, WA (US); Omer Ocak, Seattle, WA (US); Nader Nabil Farouk Riad, Bothell, WA (US); Robert L Engelhart, Bellevue, WA (US); Muhammad Waqar Afzal, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 104 days.

This patent is subject to a terminal disclaimer.

(21) Appl. No.: 18/354,529

(22) Filed: Jul. 18, 2023

(65) Prior Publication Data
US 2023/0362604 A1 Nov. 9, 2023

Related U.S. Application Data

(62) Division of application No. 17/326,816, filed on May 21, 2021, now Pat. No. 11,751,023.

(51) Int. Cl.
*H04W 4/24* (2024.01)
*H04L 12/14* (2024.01)
(Continued)

(52) U.S. Cl.
CPC .......... *H04W 4/24* (2013.01); *H04L 12/1407* (2013.01); *H04M 15/66* (2013.01); *H04M 15/74* (2013.01);
(Continued)

(58) Field of Classification Search
CPC ........ H04W 8/02; H04W 8/20; H04W 28/04; H04W 4/24
(Continued)

(56) References Cited

U.S. PATENT DOCUMENTS 8,644,355 B2 * 2/2014 Agarwal et al. ........ H04W 8/08
370/522
8,856,328 B2 * 10/2014 Chang et al. ........... H04L 69/40
709/224
(Continued)

OTHER PUBLICATIONS

The Extended European Search Report mailed Oct. 18, 2022 for European Patent Application No. 22173777.8, 14 pages.
(Continued)

*Primary Examiner* — Rafael Pérez-Gutiérrez
(74) *Attorney, Agent, or Firm* — Lee & Hayes, P.C.

(57) ABSTRACT

Systems, methods, and devices can be utilized to provide charging function (CHF) fallback in a $5^{th}$ Generation Core (5GC). An example method is performed by a fail-open function (FOF), and includes receiving, from the CHF, information corresponding to a subscriber of a network. The information is stored in a database. Further, the example method includes receiving, from the CHF or a connected function, a request corresponding to the subscriber. The connected function is a session management function (SMF) and/or a policy control function (PCF). Based on the request, the information stored in the database is at least one of accessed or modified. Based on performing at least one of accessing or modifying the information stored in the database, a response is generated and transmitted to the CHF or the connected function.

20 Claims, 8 Drawing Sheets

(51) Int. Cl.
    *H04M 15/00* (2024.01)
    *H04W 8/02* (2009.01)
    *H04W 8/20* (2009.01)
    *H04W 28/04* (2009.01)
(52) U.S. Cl.
    CPC .............. *H04W 8/02* (2013.01); *H04W 8/20* (2013.01); *H04W 28/04* (2013.01)
(58) Field of Classification Search
    USPC ................. 455/406, 414.1, 405, 418, 461
    See application file for complete search history.

(56) References Cited

U.S. PATENT DOCUMENTS

| | | | |
|---|---|---|---|
| 10,531,515 B1 * | 1/2020 | Engelhart | H04M 15/71 |
| 11,252,246 B1 * | 2/2022 | Engelhart | H04L 67/55 |
| 11,336,471 B2 * | 5/2022 | Yadav et al. | H04M 15/852 |
| 11,444,827 B2 * | 9/2022 | Afzal et al. | H04M 15/8027 |
| 11,751,023 B2 * | 9/2023 | Hamid et al. | H04M 15/74 455/406 |
| 11,765,278 B2 * | 9/2023 | Mangalaparthi et al. | H04M 15/66 455/408 |
| 12,003,599 B2 * | 6/2024 | Engelhart | H04M 15/70 |
| 2011/0035336 A1 | 2/2011 | Cai | |
| 2011/0211527 A1 * | 9/2011 | Agarwal et al. | H04L 61/4588 370/328 |
| 2013/0031252 A1 | 1/2013 | Chang | |
| 2014/0273932 A1 * | 9/2014 | Sharma et al. | H04W 4/24 455/406 |
| 2020/0177439 A1 * | 6/2020 | Afzal et al. | H04L 12/1403 |
| 2020/0267802 A1 * | 8/2020 | Engelhart | H04M 15/70 |
| 2021/0112406 A1 | 4/2021 | Jiang | |
| 2021/0194709 A1 * | 6/2021 | Yadav et al. | H04M 15/735 |
| 2022/0045874 A1 * | 2/2022 | Chai | H04M 15/66 |
| 2022/0116469 A1 * | 4/2022 | Engelhart | H04M 15/85 |
| 2022/0272520 A1 | 8/2022 | Cakulev | |
| 2022/0377510 A1 | 11/2022 | Hamid | |
| 2023/0362604 A1 * | 11/2023 | Hamid et al. | H04W 8/20 |

OTHER PUBLICATIONS

Office Action for U.S. Appl. No. 17/326,816, mailed on Nov. 18, 2022, Saad Hamid, "Charging Function Fallback", 16 pages.

* cited by examiner

CHARGING FUNCTION FALLBACK

CROSS REFERENCE TO RELATED APPLICATIONS

This application is a divisional of and claims priority to commonly assigned, co-pending U.S. patent application Ser. No. 17/326,816, filed May 21, 2021. Application Ser. No. 17/326,816 is fully incorporated herein by reference.

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Some telecommunications systems may include fifth generation (5G) cellular-wireless access technologies to provide improved bandwidth and decreased response times to a multitude of devices that may be connected to a network.

A 5G Core (5GC) network includes various functions relating to tracking usage of the 5GC by various devices connected to the 5GC. In particular, the 5GC includes a Charging Function (CHF) configured to provide charging services to the 5GC. In addition, the CHF is configured to communicate with external billing systems.

BRIEF DESCRIPTION OF THE DRAWINGS

The detailed description is set forth with reference to the accompanying figures.

DETAILED DESCRIPTION

Figure 1:
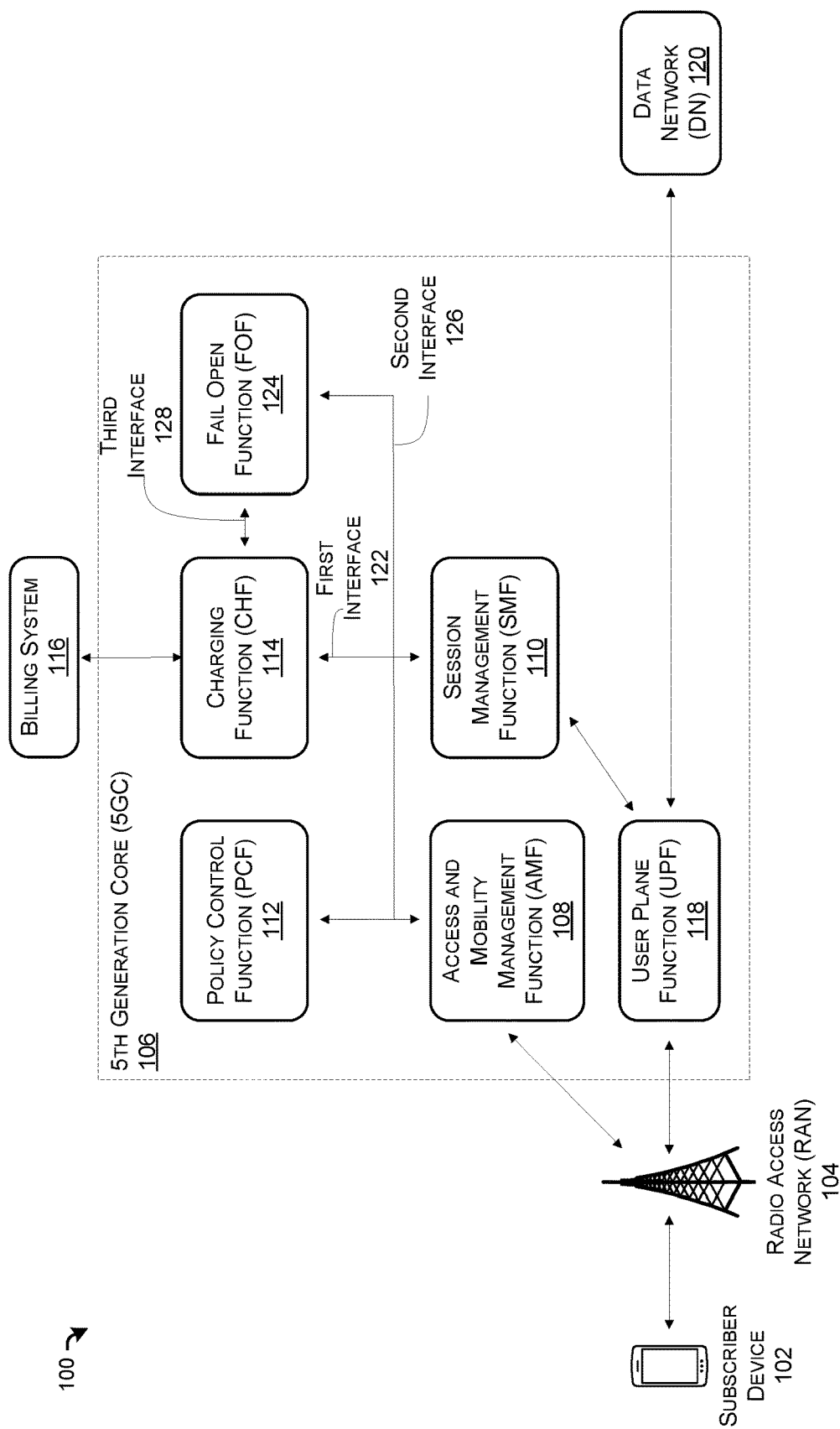
FIG. 1 illustrates an example network environment for providing CHF fallback.

The systems, devices, and techniques described herein relate to techniques for providing CHF fallback in a 5GC. In various implementations, the CHF can be integral to charging services within the 5GC. The CHF may include a database that stores subscriber information. This information may indicate the type of data services used by a subscriber, a type of plan the subscriber has with the 5GC, and so on. The CHF may provide feedback to other elements of the 5GC if the subscriber's plan limits a session associated with the subscriber (e.g., limits the amount of data that can be transmitted in the session) and/or indicates a priority of the session within the 5GC. According to some implementations, the CHF may track usage of 5GC resources by the subscriber. In particular examples, the CHF interacts with a session management function (SMF) and/or a policy control function (PCF) within the 5GC as the session is being established and/or as the session continues.

The CHF is a critical function in the 5GC. Accordingly, if the CHF is at least partially offline or otherwise unreachable by other functions within the 5GC, charging services may be significantly interrupted. In some cases, when the CHF is offline or otherwise unreachable, the 5GC may be unable to apply predetermined policies to sessions associated with individual subscribers and/or may be unable to track usage of the 5GC by the subscribers.

According to various cases described herein, a Fail-Open Function (FOF) is introduced to the 5GC. The FOF may be configured to store a copy of subscriber information that is stored in the CHF. In some cases, the FOF may be implemented by one or more first hardware devices (e.g., servers), the CHF may be implemented by one or more second hardware devices (e.g., servers), wherein the first hardware device(s) are different than the second hardware device(s). Furthermore, the FOF may be reachable via a first communications interface, the CHF may be reachable via a second communications interface, wherein the first communications interface(s) are different than the second communications interface(s). Thus, the FOF may remain online and/or reachable even if the CHF is not.

When the CHF is at least partially offline or otherwise unreachable, the 5GC may retrieve and/or modify the copy of the subscriber information that is stored in the FOF. In some examples, the FOF may update the CHF with any changes to the copy of the subscriber information that occurred while the CHF was offline. Thus, the 5GC may continue to enforce policies associated with the subscriber and track subscriber usage even when the CHF is unreachable.

Various implementations described herein are directed to specific improvements in the field of telecommunications. For example, implementations of the FOF described within this disclosure enable a telecommunications network to track subscriber usage and implement subscriber-specific policies even when a CHF cannot be reached. Accordingly, interruptions of the CHF may not interrupt charging policies implemented by the network. From a user perspective, outages of the CHF may be invisible to the subscriber, and therefore interruptions to sessions may be avoided.

Implementations of the present disclosure will now be described with reference to the accompanying figures.

FIG. 1 illustrates an example network environment 100 for providing CHF fallback. In various implementations, a session associated with a subscriber device 102 may be set up. According to some examples, the subscriber device 102 may request that the session be initiated. In some cases, an external device requests the session with the subscriber device 102. The subscriber device 102 may be a user equipment (UE). The terms "UE," "user device," "wireless communication device," "wireless device," "communication device," "mobile device," and "client device," can be used interchangeably to describe any UE that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future IP-based network technology or evolution of an existing Internet Protocol (IP)-based network technology.

Examples of UEs can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

As used herein, the term "session," and its equivalents, can refer to a transmission of data between two endpoints or nodes. A session may include a unidirectional or bidirectional data flow. Examples of sessions include voice calls, internet browsing downloads, and the like. For example, the session may include data transmitted between the subscriber device 102 and an external device, such as an external UE or a server. The data transmitted in the session may be associated with one or more particular 5G Quality of Service Identifiers (5QIs), guaranteed bit rate (GBR) data, data associated with greater than a threshold priority, data associated with less than a threshold packet delay budget, or the like. The term "GBR data," or its equivalents, can refer to a designation for data that are delivered via a guaranteed bandwidth or bit rate. GBR data may be Quality of Service (QoS)-sensitive data. For example, GBR data may include any of conversational voice data, conversational video (live streaming) data, real time gaming data, Vehicle-to-X (V2X) data, electricity distribution data, process automation (monitoring) data, non-conversational video (buffered streaming) data, mission critical user plane Push to Talk (PTT) voice data, non-mission-critical user plane PTT voice data, mission critical video user plane data, and certain V2X message data. In other examples, GBR data may include different types of QoS-sensitive data.

In some cases, the subscriber device 102 may initiate the session by transmitting a signal requesting the session to a Radio Access Network (RAN) 104. In various examples, the subscriber device 102 may transmit the request over one or more wireless resources. The terms "RAN," "base station," "access point (AP)," or their equivalents, can refer to one or more devices that can transmit and/or receive wireless services to and from one or more UEs in a coverage area. For example, a RAN can be implemented as a variety of technologies to provide wired and/or wireless access to the network, as discussed herein. In some instances, the RAN 104 can include a 3GPP RAN, such a GSM/EDGE RAN (GERAN), a Universal Terrestrial RAN (UTRAN), or an evolved UTRAN (E-UTRAN), or alternatively, a "non-3GPP" RAN, such as a WI-FI RAN, or another type of wireless local area network (WLAN) that is based on the Institute of Electrical and Electronics Engineers (IEEE) 802.11 standards. Further, a base station can include any number and type of transceivers and/or base stations representing any number and type of macrocells, microcells, picocells, or femtocells, for example, with any type or amount of overlapping coverage or mutually exclusive coverage. For example, the subscriber device 102 may transmit the signal wirelessly to the RAN 104. The signal may initiate service usage of the subscriber device 102.

In some instances, the RAN 104 utilizes wireless resources specified in the 5G New Radio (NR) standard, as defined by 3GPP. In certain implementations, the base station 102 can transmit and receive communications over frequency resources including "millimeter wave" bands including, but not limited to 26 GHz, 28 GHz, 39 GHz, 60 GHz, and the like. In some embodiments, the RAN 104 can be, or at least include a gNodeB.

In addition, the RAN 106 may utilize other types of wireless resources. For example, the RAN 106 may utilize a wireless band including frequency resources in at least one of a Citizens Broadband Radio Service (CBRS) band (e.g., a 3550-3700 MHz band), a Long Term Evolution (LTE) Band 71 (e.g., a 600 MHz band), an LTE Band 48 (e.g., 3500 MHz), and the like. In some instances, the frequency resources can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE Band 50 (1500 MHz), LTE Band 51 (1500 MHz), LTE Band 66 (1700 MHz), LTE Band 70 (2000 MHz), and LTE Band 74 (1500 MHz). Although referred to in the context of LTE bands, it can be understood that the base station may utilize the frequency resources discussed herein in the context of any 5G embodiments.

In some embodiments, the RAN 106 is part of a Non-Standalone (NSA) architecture and/or a Standalone (SA) architecture. In an NSA architecture, the RAN 106 may be coordinate with an LTE base station (not illustrated), and/or may relay services between devices in the cell 104 and an LTE core network (e.g., an Evolved Packet Core (EPC), not illustrated). In an SA architecture, the RAN 104 may relay services between devices in the cell and a 5G Core (5GC) 106.

In various implementations, the RAN 104 may include one or more devices configured to transmit and/or receive data wirelessly over one or more wireless resources within a cell region (also referred to as a "cell"). The cell region may refer to a geographical region that includes the RAN 104. The subscriber device 102 may be located within the cell region. For example, in some examples, the RAN 104 may include an eNodeB, a gNodeB, or any combination thereof.

The RAN 104 may be configured to relay communications between one or more external networks (e.g., the 5GC 106) and the devices located in the cell of the RAN 104, such as the subscriber device 102. Based on the signal from the subscriber device 102, the RAN 104 may forward a request to set up the session to the 5GC 106. In particular, the request from the RAN 104 may be received by an Access and Mobility Management Function (AMF) 108. The AMF 108 may be implemented in hardware and/or software. In general, the AMF can be implemented as a network function including functionality to provide UE-based authentication, authorization, mobility management, etc., to various UEs, such as the subscriber device 102. In some instances, the AMF 108 can include functionality to terminate a RAN control plane interface for the RAN 104. In some instances, the AMF 108 can include functionality to perform registration management of the subscriber device 102 in the RAN 104 and/or 5GC 106, connection management, reachability management, mobility management, access authentication, access authorization, security anchor functionality (e.g., receiving and/or transmitting security keys during registration/authorization), and the like.

The AMF 108 is configured to select a Session Management Function (SMF) 110 for managing a context of the session associated with the subscriber device 102. The SMF 110 may be implemented in hardware and/or software. In general, the SMF 110 can be implemented as a network function including functionality to manage communication sessions by and between UEs (such as the subscriber device 102) and/or to provide IP addresses to the UEs. In some implementations, the SMF 110 may further access subscriber information in order to manage the sessions associated with the 5GC 106.

The 5GC 106 further includes a Policy Control Function (PCF) 112. The PCF 112 may be implemented in hardware and/or software. In general, the PCF 112 can be implemented as a network function including functionality to support unified policy framework to govern network behavior, provide policy rules to control plane functions and/or enforce such rules, and/or implement a front-end to access subscriber information relevant for policy decisions in a data repository.

In various cases, the subscriber information accessed by the SMF 110 and/or the PCF 112 is stored in a charging function (CHF) 114. The CHF 114 may be implemented in hardware and/or software. In general, the CHF 114 provides an integrated charging system that controls message commands, chargeable events, and charging-related subscriber information. In particular, the CHF 114 implements data connectivity charging for the SMF 110 and provides spending limit control functionalities for the PCF 112. To implement these and other functions, the CHF 114 stores subscriber information associated with multiple subscribers (e.g., users, account holders, etc.) of the 5GC 106. For example, the CHF 114 stores subscriber information associated with a user of the subscriber device 102. In particular implementations, the CHF 114 includes one or more databases that store the subscriber information. Although not illustrated in FIG. 1, in some implementations, the CHF may include and/or be further connected to a rating function (RF), an account balance management function (ABMF), and a charging gateway function (CGF).

In various examples, the CHF 114 interacts with an external billing system 116. The external billing system 116 may be implemented in hardware and/or software, and may be outside of the 5GC 106. Although not illustrated in FIG. 1, in some cases, the CGF may be connected to the billing system 116. The billing system 116 may be configured to implement subscriber policies on behalf of a carrier. As used herein, the term "carrier," and its equivalents, may refer to an organization and/or system responsible for administering a network. In some cases, subscribers may enroll in various subscriber plans offered by the carrier. The subscriber plans, for example, may be associated with usage limits (e.g., data limits, allowed services, etc.) and/or monetary charges for usage of the 5GC 106, such as subscription fees (e.g., to be paid by the subscribers quarterly, monthly, weekly, biweekly, etc.) and/or overage charges (e.g., to be paid if subscribers exceed certain limits). According to some cases, the limits associated with the subscriber plans are reset periodically, such as monthly, biweekly, weekly, etc. For instance, the subscriber of the subscriber device 102 may be allotted 10 units of data that can be delivered using the 5GC 106 per month. The billing system 116 may transmit information to the CHF 114 that is indicative of the subscriber plans. In some implementations, the billing system 116 may transmit the information periodically (e.g., when the limits are reset, such as the end of every month), in response to events (e.g., when the subscriber changes their subscriber plan), or a combination thereof. The CHF 114 may modify the subscriber information stored in the CHF 114 based on the information from the billing system 116.

As used herein, the term "subscriber information," and its equivalents, may refer to data indicative of limits on usage of a network by a subscriber and/or usage of the network by the subscriber. The subscriber information stored in the CHF 114, for instance, may include an amount and/or type of services that the subscriber is permitted to transmit and/or receive using the 5GC 106 in accordance with the subscriber's plan. In some examples, the subscriber information may indicate a remaining amount of services and/or a total amount of services that the subscriber can transmit and/or receive using the 5GC 106. For instance, the amount of services may be an amount of data (e.g., in gigabytes (GB) or some other data measurement) of data traversing the 5GC 106, a number of sessions delivered using the 5GC 106, or the like. In various implementations, the type of services may include at least one of a QoS of the services (e.g., a 5G Quality Indicator (5QI) of the services), a latency (e.g., a maximum allowed latency) of the services, a bandwidth (e.g., uplink and/or downlink) allotted to the services, or a slice type (SST) of the services. In some cases, the subscriber information may indicate whether the subscriber is permitted to transmit and/or receive GBR services using the 5GC 106.

According to some implementations, the subscriber information may indicate usage-based limits and/or surcharges associated with the subscriber. For example, the subscriber information may indicate that the subscriber device 102 is allowed to transmit and/or receive an amount and/or type of services when the subscriber device 102 is located in a certain geographical region (e.g., a cell area of the RAN 104), but that the subscriber device 102 is allowed to transmit and/or receive a different amount and/or type of services when the subscriber device 102 is located outside of the certain geographical region (e.g., in a roaming region). In some cases, the subscriber information may limit an amount and/or type of services that the subscriber device 102 is permitted to transmit and/or receive using the 5GC 106. In some instances, the subscriber information may indicate that the subscriber incurs additional charges (e.g., surcharges) if the subscriber device 102 transmits and/or receives greater than a threshold amount, or one or more specific types, of services using the 5GC 106.

In some cases, the 5GC 106 may implement quota management for the subscriber device 102 using the CHF 114. For example, the subscriber device 102 may be associated with a threshold amount of services (e.g., a threshold number of sessions, a threshold amount of data, etc.) that the subscriber device 102 is allowed to consume. The CHF 114 may store subscriber information including an indication of the threshold associated with the subscriber device 102. In some cases, the CHF 114 may be configured to track an amount of services (e.g., a number of sessions, an amount of data transmitted to and/or from the subscriber device 102, etc.) that the subscriber device 102 consumes.

In particular examples, the subscriber information stored in the CHF 114 may include one or more policy counters. As used herein, the term "policy counter," and its equivalents, may refer to a metric that tracks an amount of network resources utilized by a subscriber device, such as an amount of data transmitted and/or received by the subscriber device over a network, an amount of sessions (e.g., voice calls, text messages, etc.) that the subscriber has engaged in over the network, and the like. In various examples, a policy counter associated with a subscriber device is periodically reset, such as at the end of a billing period associated with the subscriber device. The CHF 114 may be configured to store subscriber information including one or more policy counters associated with the subscriber device 102.

In various examples, the subscriber information stored in the CHF 114 and associated with the subscriber device 102 may further include at least one identifier of the subscriber and/or the subscriber device 102. For instance, the subscriber information may indicate, for example, at least one of a Subscription Permanent Identifier (SUPI) associated with the subscriber, an identifier of the session requested by the subscriber device 102, a type of the session requested by the subscriber device 102, a Data Network Name (DNN) associated with the subscriber device 102, Single-Network Slice Selection Assistance Information (S-NSSAI) associated with the subscriber device 102, a Generic Public Subscriber Identifier (GPSI) associated with the subscriber device 102, an Internal Group Identifier (IGI) associated with the subscriber device 102, an access type, an Internet Protocol (IP) address (e.g., an IP address prefix) of the subscriber device 102, a Permanent Equipment Identifier (PEI) associated with the subscriber device 102, a location of the subscriber device 102 (e.g., a time zone), a serving network of the subscriber device 102, or any combination thereof. In some cases, the CHF 114 stores the subscriber information in an entry of a database. The CHF 114 may store multiple entries corresponding to multiple subscribers of the 5GC 106. For example, the database may be indexed by subscriber and/or subscriber device identifier, such that the CHF 114 may be able to efficiently identify the entry associated with the subscriber and/or subscriber device 102 based on a request specifying an identifier of the subscriber and/or subscriber device 102.

The billing system 116 may interact with the CHF 114 based on the subscriber information. For example, the billing system 116 may transmit a message to the CHF 114 that causes the CHF 114 to store and/or modify the subscriber information. In some cases, the billing system 116 may cause the CHF 114 to reset the subscriber information when a billing period begins. For example, if the subscriber information indicates a remaining amount of data that is allocated to the subscriber, the remaining amount of data may be reset to an original amount at the beginning of the billing period. In addition, the CHF 114 may transmit a message indicating the subscriber information to the billing system 116. For instance, if the subscriber information indicates that the subscriber has incurred a surcharge, the CHF 114 may inform the billing system 116 of the surcharge. The billing system 116 may generate or may be used to generate a bill for the surcharge that is addressed to the subscriber. Accordingly, the carrier managing the billing system 116 may monetize and/or limit usage of the 5GC 106 by the subscriber device 102.

In addition, the SMF 110 and/or the PCF 112 may send requests for the subscriber information from the CHF 114. In some cases, the SMF 110 and/or the PCF 112 may send requests to modify the subscriber information stored in the CHF 114. For example, the SMF 110 may transmit, to the CHF 114, a request to update the subscriber information associated with the subscriber device 102, based on the session. In various implementations, the CHF 114 may update the subscriber information associated with the subscriber device 102 in the database(s) of the CHF 114 based on the request from the SMF 110. For instance, the request may indicate usage of the 5GC 106 by the subscriber device 102 and the CHF 114 may update the subscriber information based on the usage of the 5GC 106 by the subscriber device 102. In addition, the CHF 114 may return a response to the request indicating that the charging data has been updated.

In addition, the SMF 110 may request subscriber information from the CHF 114. For example, the SMF 110 may request a type of services (e.g., 5QI services) that the subscriber device 102 is allowed to transmit and/or receive using the 5GC 106. In various implementations, the SMF 110 may select a User Plane Function (UPF) 118 for the session based on the subscriber information. Furthermore, the SMF 110 may provision policy and/or threshold rules for usage control by the UPF 118 of the requested session. In some cases, the SMF 110 may cause the UPF 118 to deliver requested 5QI services (e.g., at a particular maximum latency associated with the 5QI services) if the subscriber information indicates that the 5QI services are permitted for the subscriber. For example, the SMF 110 may cause the UPF 118 to enforce a particular uplink and/or downlink rate for the services.

In general, the UPF 118 can be implemented as a network function including functionality to control data transfer between the subscriber device 102 and the various components of the environment 100. In some instances, the UPF 118 can include functionality to act as an anchor point for Radio Access Technology (RAT) handover (e.g., inter and intra), external protocol data unit (PDU) session point of interconnect to an external network (e.g., the Internet), packet routing and forwarding, packet inspection and user plane portion of policy rule enforcement, traffic usage reporting, traffic routing, QoS handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, the UPF 118 may be one or more UPFs, which are associated with the subscriber device 102.

The PCF 112 may also rely on the CHF 114 to perform various functions. In some implementations, the PCF 112 may request and/or modify subscriber information stored in the CHF 114. In some examples, during session setup, the PCF 112 may interface with a User Data Repository (UDR) in the 5GC 106 (not illustrated) to identify a profile associated with the subscriber device 102. The profile may specify one or more policy rules associated with the subscriber device 102. The PCF 112 may be configured to make a policy decision about the session based on the profile of the subscriber device 102, the type of services being requested in the session, and/or other features of the session. In some examples, the PCF 112 may determine the policy decision by interfacing with the CHF 114. For instance, the PCF 112 may determine the policy decision based on the subscriber information (e.g., policy counter(s)) stored in the CHF 114. In some cases, the PCF 112 may transmit, to the CHF 114, a request for subscriber information. In some cases, the request for the subscriber information may specify a particular type of policy counter stored by the CHF 114. In various implementations, the CHF 114 may refer to the database(s) within the CHF 114 to identify the policy counters associated with the subscriber device 102. The CHF 114 may return an indication of the requested policy counter(s) to the PCF 112. For example, the PCF 112 may receive a policy counter indicating that the subscriber device 102 has transmitted and/or received five units of data during a current time period (e.g., billing period). The PCF 112 may compare the policy counter to subscriber information associated with the subscriber device 102. For example, the PCF 112 may determine that the five units of data is less than the 10 units of data allotted to the subscriber device during the current time period. Accordingly, the PCF 112 may make a policy decision that the session is to be allowed and allocated particular resources within the 5GC 106. The PCF 112 may indicate (e.g., to the SMF 110), the policy decision associated with the session and/or the subscriber device 102.

In addition, the CHF 114 may update the database(s) based on the session requested by the subscriber device 102. For example, the SMF 110 and/or the PCF 112 may transmit a request to the CHF 114 for adjusting subscriber information (e.g., policy counter(s)) associated with an amount of data transmitted and/or received by the subscriber device 102 based on the amount of data transmitted and/or received by the subscriber device 102 in the session. In some cases, the CHF 114 may adjust (e.g., increase) subscriber information associated with a number of sessions associated with the subscriber device 102 based on the requested session. Accordingly, the CHF 114 may ensure that the subscriber information is updated based on the session.

In some examples, the SMF 110 and/or the PCF 112 may rely on the subscriber information stored in the CHF 114 to manage existing sessions associated with the subscriber device 102. For example, the subscriber information may indicate that the subscriber device 102 has reached a limit (e.g., a data limit) of the subscriber's plan with the carrier during the session. The SMF 110 and/or the PCF 112 may enforce the limit during the session. For example, the SMF 110 may cause the UPF 118 to throttle a transmission rate of data in the session based on the exceeded limit.

In the example illustrated in FIG. 1, the UPF 118 may be configured to deliver data in the session to or from a Data Network (DN) 120. Examples of the DN 120 include, for instance, a wide area network (WAN), such as the Internet. In some instances, DN 120 may include or be connected to an IP Multimedia Subsystem (IMS) core (sometimes referred to as an "IMS core network," an "IMS network," or an "IM CN Subsystem"). IMS is an architectural framework defined by 3GPP for delivering Internet Protocol (IP) multimedia to a device, such as the subscriber device 102. The IMS core can be maintained and/or operated by one or more service providers, such as one or more wireless carriers ("carriers"), that provide IMS-based services to a user who is associated with the device. For example, a service provider can offer multimedia telephony services that allow a user to call or message other users via the IMS core using their device. A user can also utilize an associated device to receive, provide, or otherwise interact with various different IMS-based services by accessing the IMS core. It is to be appreciated that any number of base stations, such as base station 102, and/or IMS nodes can be associated with the IMS network.

An operator (e.g., a carrier) of the IMS core can offer any type of IMS-based service, such as, telephony services, emergency services (e.g., Enhanced 911 (E911)), gaming services, instant messaging services, presence services, video conferencing services, social networking and sharing services, location-based services, push-to-talk services, and so on. In order to access these services (e.g., telephony services), a device is configured to request establishment of a communication session. In the case of telephony services, the communication session can comprise a call (e.g., a voice-based communication session, such as a Voice Over LTE (VoLTE) call, or a Wi-Fi call). The RAN 104 may be configured to transmit the data in the session to and/or from the subscriber device 102 over one or more wireless resources. Accordingly, the session may be established between the subscriber device 102 and the DN 120. For instance, the DN 120 may include a server that transmits data to and/or receives data from the subscriber device 102 via the UPF 118.

In various implementations, the CHF 114 may be relied upon by the SMF 110 and/or the PCF 112 to set up sessions for the subscriber device 102 and/or manage existing sessions by the subscriber device 102. In certain cases, however, at least a portion of the CHF 114 may be unreachable by the SMF 110 and/or the PCF 112. For example, a first interface 122 connecting the SMF 110 and/or the PCF 112 to the CHF 114 may become disconnected, such that the CHF 114 may be unable to receive a request transmitted from the SMF 110 and/or the PCF 112. Although not illustrated in FIG. 1, there may be two separate first interfaces 122 respectively connecting the SMF 110 and the PCF 112 to the CHF 114. In some examples, a front-end of the CHF 114 (e.g., a load balancer) may have an outage, which may prevent the SMF 110 and/or the PCF 112 from reaching the CHF 114. In some implementations, another component of the CHF 114 is experiencing an outage, such that the CHF 114 cannot access the database(s) storing the subscriber information associated with the subscriber device 102.

In various implementations of the present disclosure, a Fail Open Function (FOF) 124 is configured to accommodate requests from the SMF 110 and/or the PCF 112 when at least a portion of the CHF 114 is reachable. The FOF 124 may include one or more databases configured to store a copy of the policy counter(s) associated with the subscriber device 102. The FOF 124 may be implemented in software and/or hardware, but may be implemented in one or more different devices than the device(s) implementing the CHF 114. Thus, even if there is an outage of hardware implementing at least a portion of the CHF 114, the FOF 124 may nevertheless continue functioning uninterrupted. Furthermore, the SMF 110 and/or the PCF 112 may be connected to the FOF 124 via a second interface 126, wherein the first interface 122 is different than the second interface 126. Thus, even if an outage in the first interface 122 prevents the SMF 110 and/or the PCF 112 from communicating with the CHF 114, the SMF 110 and/or the PCF 112 may still be able to communicate with the FOF 124 over the second interface 126.

In some cases, the SMF 110 and/or the PCF 112 may determine that it is unable to reach the CHF 114. For example, the SMF 110 and/or the PCF 112 may determine that greater than a threshold amount of time after transmitting the request towards the CHF 114 has passed without receiving a response from the CHF 114. In some cases, the CHF 114 may return an error message to the SMF 110 and/or PCF 112. Upon determining that the CHF 114 is unreachable, the SMF 110 and/or the PCF 112 may transmit the request to the FOF 124.

In some cases, like the CHF 114, the FOF 124 may include at least one database storing a copy of the subscriber information. Thus, the FOF 124 may refer to its own copy of the subscriber information to return the requested subscriber information to the SMF 110 and/or the PCF 112. Further, the FOF 124 may modify the subscriber information in accordance with a request from the SMF 110 and/or the PCF 112. Thus, the FOF 124 may at least temporarily be a substitute for the unreachable CHF 114.

In some implementations, at least a portion of the CHF 114 is functioning and communicates with the FOF 124 over a third interface 128. For example, in some cases, a front-end of the CHF 114 is experiencing an outage, such that the SMF 110 and/or the PCF 112 may be unable to transmit the request to the CHF 114. However, the database(s) of the CHF 114 may remain functioning. In some cases, the SMF 110 and/or the PCF 112 transmits the request to the FOF 124, which may transmit a message to a functioning portion of the CHF 114 over the third interface 128. The functioning portion of the CHF 114 may retrieve and/or update the subscriber information associated with the subscriber device 102 based on the request. The functioning portion of the CHF 114 may return a response (e.g., including the requested subscriber information and/or an indication that the subscriber information has been updated) to the FOF 124 over the third interface 120, which can forward the response the SMF 110 and/or the PCF 112 for further processing. Thus, in some cases, the FOF 124 may refrain from accessing the copy of the subscriber information stored in the database(s) of the FOF 124.

In some cases, the front-end of the CHF 114 is intact, but the database(s) of the CHF 114 may be experiencing an outage. In some of these implementations, the SMF 110 and/or the PCF 112 may transmit the request to the front-end of the CHF 114 over the first interface 122. The CHF 114 may then forward the request to the FOF 124 over the third interface 128. Upon receiving the request from the CHF 114, the FOF 124 may access and/or update the subscriber information in the database(s) of the FOF 124 based on the request. The FOF 124 may further generate a response based on the accessed and/or updated subscriber information and send the response to the CHF 114. Thus, in some cases, the outage of the database(s) of the CHF 114 is invisible to the SMF 110 and/or the PCF 112.

According to various implementations, the databases of the CHF 114 and the FOF 124 can be reconciled. For example, when operating normally, the CHF 114 may transmit periodic (e.g., once every day, once every two days, once every week, or the like) updates of the subscriber information stored within the database(s) of the CHF 114 to the FOF 124 over the third interface 128. The FOF 124 may therefore update the subscriber information within the database(s) of the FOF 124 accordingly.

Furthermore, the FOF 124 may update the CHF 114 with any changes to the database(s) of the FOF 124 that have occurred while the database(s) of the CHF 114 were temporarily unreachable. For instance, upon determining that the CHF 114 has become reachable over the third interface 128, the FOF 124 may transmit indications of the subscriber information stored in the database(s) of the FOF 124, which may have been updated while the database(s) of the CHF 114 was unreachable. Accordingly, the CHF 114 may update the database(s) of the CHF 114 based on subscriber activity that occurred while the database(s) were unreachable.

Figure 2:
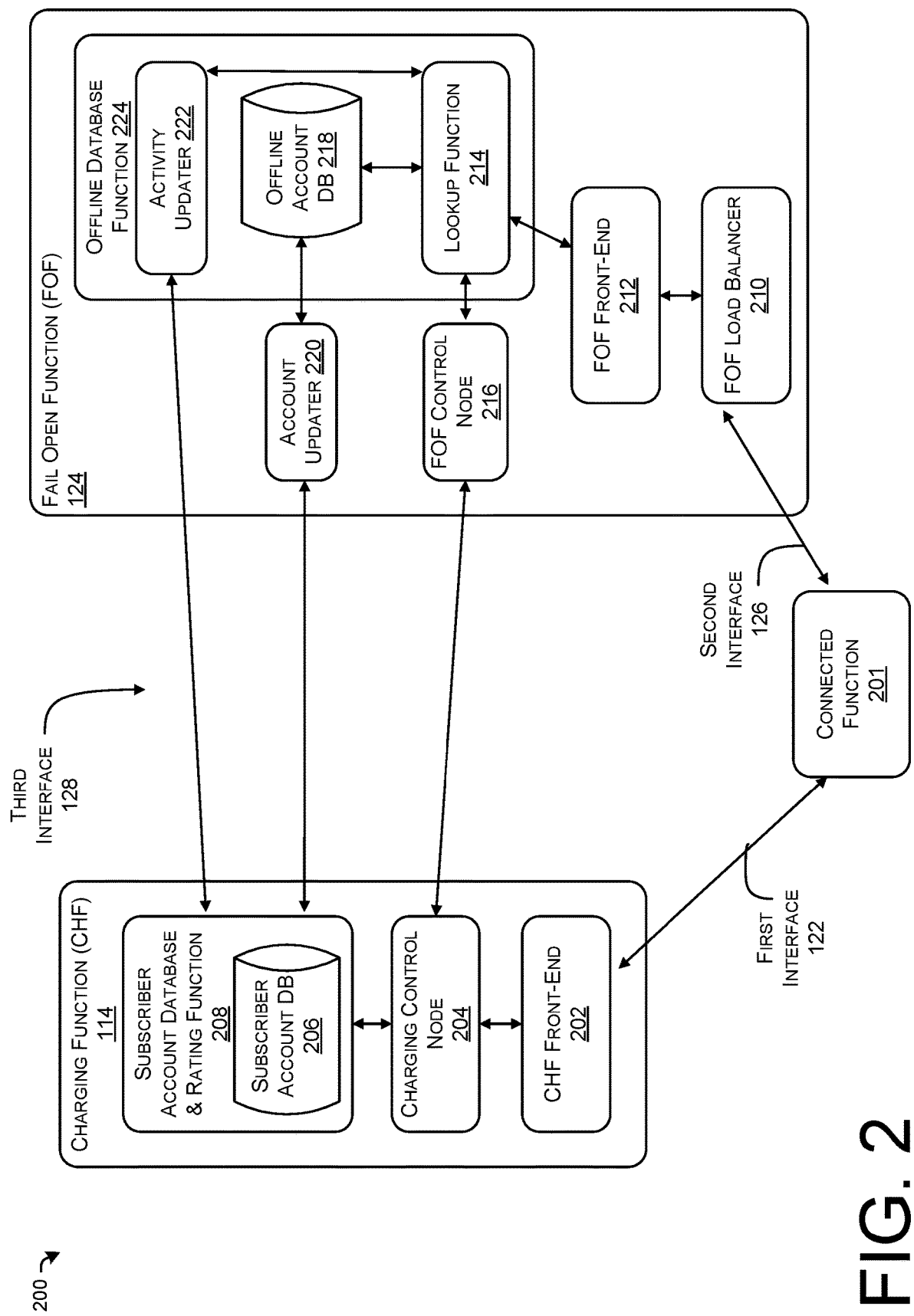
FIG. 2 illustrates an example environment illustrating CHF fallback.

FIG. 2 illustrates an example environment 200 illustrating CHF fallback. The environment 200 includes the CHF 114, the FOF 124, the first interface 122, the second interface 126, and the third interface 128 described above with reference to FIG. 1. In addition, the environment 200 includes a connected function 201, which may be the SMF 110 and/or the PCF 112 described above with respect to FIG. 1.

In various implementations, the connected function 201 may transmit a request based on a subscriber session (e.g., a session associated with the subscriber device 102 described above with reference to FIG. 1) by communicating with the CHF 114 and/or the FOF 124. The request may be to access and/or modify subscriber information associated with the session (e.g., subscriber information associated with the subscriber device 102).

In examples in which the CHF 114 is reachable and online, the connected function 201 may transmit the request to a CHF front-end 202 over the first interface 122. The CHF front-end 202 may be implemented in software and/or hardware. For example, the CHF front-end 202 may be a virtual machine (VM) operating on at least one server implementing the CHF 114. The CHF front-end 202 may be configured to receive communications over the first interface 122 from entities outside of the CHF 114. In various cases, the CHF front-end 202 may be configured to select a charging control node 204 to handle the request.

The selected charging control node 204 may be one of multiple charging control nodes included in the CHF 114. The charging control node 204 may be implemented in software and/or hardware. For example, the charging control node 204 may be a VM operating on at least one server implementing the CHF 114. In various implementations, the charging control node 204 may be configured to retrieve and/or modify subscriber information stored in a subscriber account database 206 included in a subscriber account database & rating function 208. For example, the charging control node 204 may provide requested subscriber information to the connected function 201 and/or may cause the subscriber information to be modified based on the request.

The subscriber account database & rating function 208 may be implemented in software and/or hardware. For example, the subscriber account database & rating function 208 may be include a VM within the CHF 114. Upon retrieving the data and/or modifying the data, the charging control node 204 may generate and return a response to the CHF front-end 202, which may return the response to the connected function 201 via the first interface 122. The response, for example, may include the requested subscriber information and/or indicate that the subscriber information has been modified in accordance with the request.

However, in particular implementations, the first interface 122 and/or at least a portion of the CHF 114 may be unreachable and/or nonfunctional. For example, the first interface 122 may be interrupted, but the CHF 114 may nevertheless be functional. In various implementations, the connected function 201 may determine that the first interface 122 is interrupted. For instance, the connected function 201 may attempt to transmit the request over the first interface 122, but may determine that the connected function 201 has not received the response to the request within a threshold time period of transmitting the request. Once the connected function 201 determines that the CHF 114 is unreachable, the connected function 201 may communicate with the FOF 124. For example, the connected function 201 may transmit the request over the second interface 126 to an FOF load balancer 210 within the FOF 124. In some examples, the CHF 114 may be implemented by at least one first server (e.g., in at least one first data center), and the FOF 124 may be implemented by at least one second server (e.g., in at least one second data center), wherein the first server(s) are different than the second server(s) (and the first data center(s) are different than the second data center(s)).

The load balancer 210 may receive the request from the connected function 201. The load balancer 210 may be implemented in software and/or hardware. For example, the load balancer 210 may include a VM operating on at least one server implementing the FOF 124. The load balancer 210 may be configured to distribute various requests from the connected function 201, or other connected functions (e.g., other SMFs and/or PCFs) within the network environment 200, to multiple FOF front-ends within the FOF 124. For example, the load balancer 210 may evenly distribute the requests between the multiple FOF front-ends. In various cases, the load balancer 210 is configured to select an FOF front-end 212 for the request from the connected function 201. The load balancer 210 may forward the request to the selected FOF front-end 212. The FOF front-end 212 may be implemented in hardware and/or software. For example, the FOF front-end 212 may be include a VM within the FOF 124.

In various cases, the FOF front-end 212 may transmit the request to a lookup function 214, which may be part of an offline database function 224 within the FOF 124. The lookup function 214 may be implemented in hardware and/or software. For example, the lookup function 214 may include a VM operating on at least one server implementing the FOF 124. In various examples, the lookup function 214 may be configured to determine whether to process requests within the FOF 124 or whether to forward requests to the CHF 114. For example, the lookup function 214 may interact with an FOF control node 216 and/or an activity updater 222 to determine whether the CHF 114 is reachable via the third interface 128. The FOF control node 216 and the activity updater 222 may respectively be implemented in hardware and/or software. For example, the FOF control node 216 and/or the activity updater 222 may be implemented in one or more VMs hosted by the FOF 124. For example, the FOF control node 216 may transmit a signal to the lookup function 214 indicating that the charging control node 204 of the CHF 114 is reachable via the third interface 128. Similarly, activity updater 222 may transmit a signal to the lookup function 214 indicating that the subscriber account database & rating function 208 is reachable via the third interface 128. Upon receiving the request, the lookup function 214 may transmit the request to the FOF control node 216 and/or the activity updater 222 based on the connectivity of the CHF 114 and the FOF 124 over the third interface 128.

In various implementations, the lookup function 214 may determine that the charging control node 204 is reachable by the FOF control node 216 via the third interface 128. Thus, the lookup function 214 may forward the request to the FOF control node 216, which may provide the request to the charging control node 204 over the third interface 128. Based on the request, the charging control node 204 may cause retrieval and/or modification of the subscriber information stored in the subscriber account database 206, and may return a response to the FOF control node 216 over the third interface 128. The FOF 124 may return the response to the connected function 201 (e.g., via the lookup function 214, the FOF front-end 212, and/or the FOF load balancer 210). Thus, even if there is an outage in the first interface 122 and/or the CHF front-end 202, the FOF 124 may enable access and/or modification of the subscriber information in the subscriber account database 206.

In some implementations, the FOF control node 216 indicates, to the lookup function 214, that the charging control node 204 is unreachable via the third interface 128. However, the activity updater 222 may indicate, to the lookup function 214, that the subscriber account database & rating function 208 is reachable via the third interface 128. In such cases, the lookup function 214 may transmit the request to the activity updater 222, which may forward the request to the subscriber account database & rating function 208. The subscriber account database & rating function 208 may access and/or modify the copy of subscriber information in accordance with the request. The subscriber account database & rating function 208 may generate a response indicating the requested and/or modified subscriber information. The subscriber account database & rating function 208 may return the response to the connected function 201 via the FOF 124. For example, the response may be transmitted over the third interface 128 to the activity updater 220, to the lookup function 214, to the FOF front-end 212, and to the FOF load balancer 210, which may transmit the response over the second interface 126 to the connected function 201.

In some cases, however, the FOF 124 may determine that the CHF 114 is unreachable. For example, the third interface 128 may be interrupted and/or the CHF 114 may be offline. Instead of communicating with the CHF 114, the FOF 124 may retrieve and/or modify a copy of the subscriber information stored in an offline account database 218. The FOF 124 may return the response to the connected function 201 based on accessing and/or modifying the offline account database 218. Accordingly, even if the CHF is offline, the FOF 124 may track and/or report ongoing usage and/or subscription info about the session and/or the subscriber device.

In various implementations, the data in the subscriber account database 206 and the offline account database 218 are reconciled when the third interface 128 is intact. For example, the subscriber account database 206 within the CHF 114 may be modified over time based on changes to subscriber information, billing periods, and the like. The subscriber account database & rating function 208, in various implementations, may transmit updated data (e.g., a copy of at least a portion of the data in the subscriber accounts database 206) to an account updater 220 in the FOF 124 via the third interface 128. The account updater 220 may be implemented in software and/or hardware. For example, the account updater 220 may be include a VM within the FOF 124. The account updater 220 may update the offline account database 218 based on the updated data. In some cases, the subscriber account database & rating function 208 transmits updates to the FOF 124 about the subscriber account database 206 periodically (e.g., once every day, once every 48 hours, etc.).

Similarly, FOF 124 may update the CHF 114 about changes to the offline account database 218 that occurred while the CHF 114 was temporarily unreachable. For example, the activity updater 222 within the FOF 124 may be configured to identify when the CHF 114 is reachable. Based on determining the CHF 114 is reachable, the activity updater 222 may cause the lookup function 214 to retrieve data stored in the offline account database 218. The retrieved data, for example, includes data that was updated and/or accessed during the outage of the CHF 114. The activity updater 222 may transmit the retrieved data to the subscriber account database & rating function 208 over the third interface 128. The subscriber account database & rating function 208 may update the subscriber account database 206 based on the retrieved data. Thus, the subscriber account database 206 may be updated based on subscriber activity that occurred while the CHF 114 was unreachable and/or offline. In various implementations, the lookup function 214, the offline account database 218, and the activity updater 222 may collectively be included in an offline database function 224 within the FOF 124.

Figure 3:
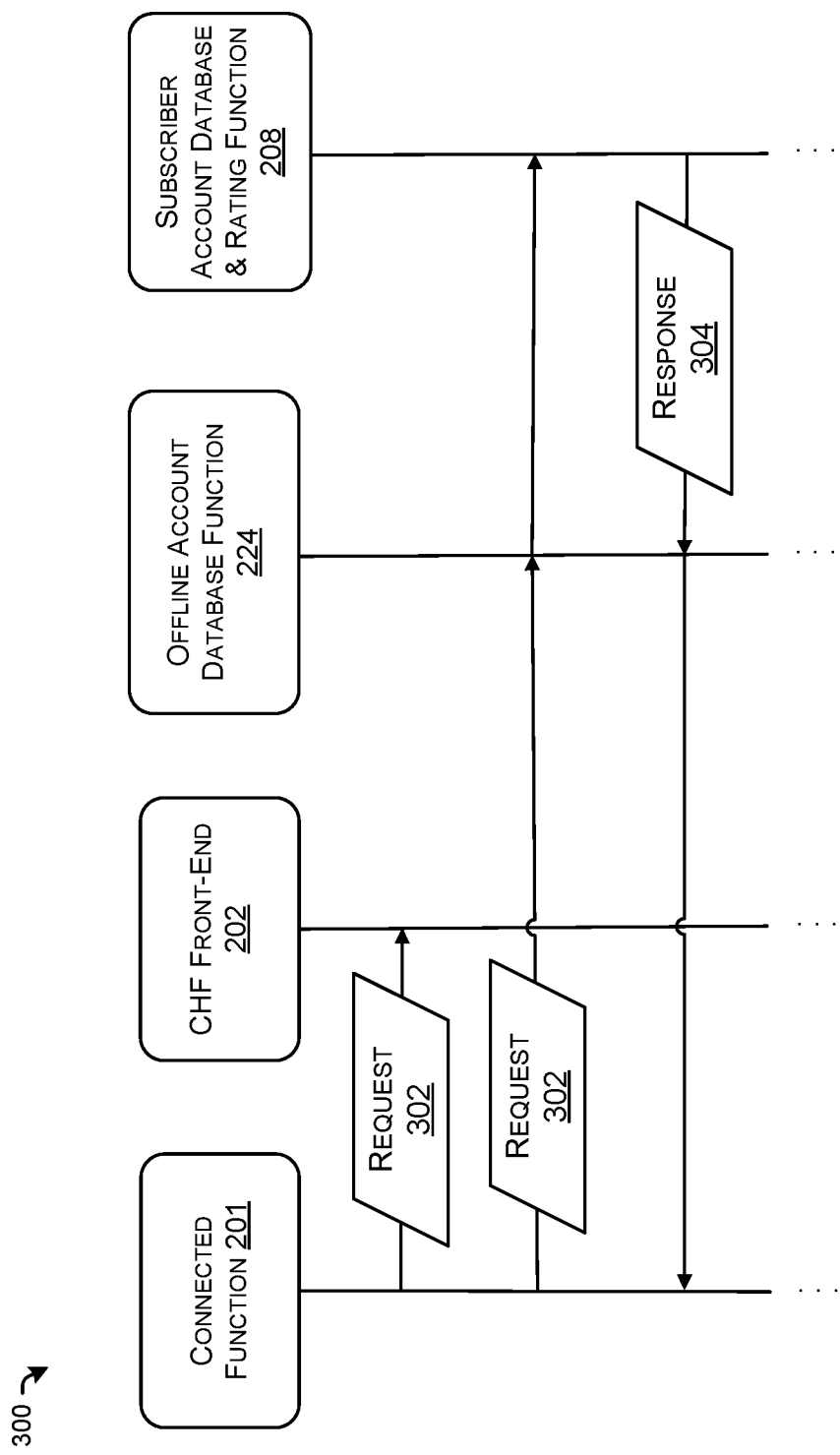
FIG. 3 illustrates example signaling for accessing and updating a CHF database when the database is reachable but the front-end of the CHF is unreachable.

FIG. 3 illustrates example signaling 300 for accessing and updating a CHF database when the database is reachable but the front-end of the CHF is unreachable. As shown, the signaling 300 is between the connected function 201, the CHF front-end 202, the offline database function 224, and the subscriber account database & rating function 208.

The connected function 201 may attempt to transmit a request 302 to the CHF front-end 202. In some examples, the request 302 is for subscriber information associated with a subscriber and/or session. In some cases, the request 302 is to change the subscriber information based on the session. The subscriber information may be stored within a database of a CHF that includes the CHF front-end 202. However, in various implementations, the CHF front-end 202 may be unreachable. For example, the connected function 201 may not receive a response from the CHF front-end 202 within a threshold time period after transmitting the request 302. Alternately, the connected function 201 may receive an error message from the CHF front-end 202.

Upon determining that the CHF front-end 202 is unreachable, the connected function 201 may transmit the request 302 to the offline account database function 224. Although not pictured in FIG. 2, the request 302 may be transmitted via an FOF load balancer and an FOF front-end prior to reaching the offline account database function 224. In various implementations, the offline account database function 224 may determine that the subscriber account database & rating function 208 is reachable. For example, the offline account database function 224 may determine that an interface between the FOF and the CHF is intact, that a charging control node is reachable, that the subscriber account database & rating function 208 is reachable but the charging control node is unreachable, or the like. The offline account database function 224 may forward the request 202 to the subscriber account database & rating function 208.

Based on the request 302, the subscriber account database & rating function 208 may modify and/or access subscriber account information stored by the subscriber account database & rating function 208. The subscriber account database & rating function 208 may generate a response 304 based on the modified and/or accessed subscriber account information. The subscriber account database & rating function 208 may transmit the response 304 back to the connected function 201 via the offline account database function 224.

Figure 4:
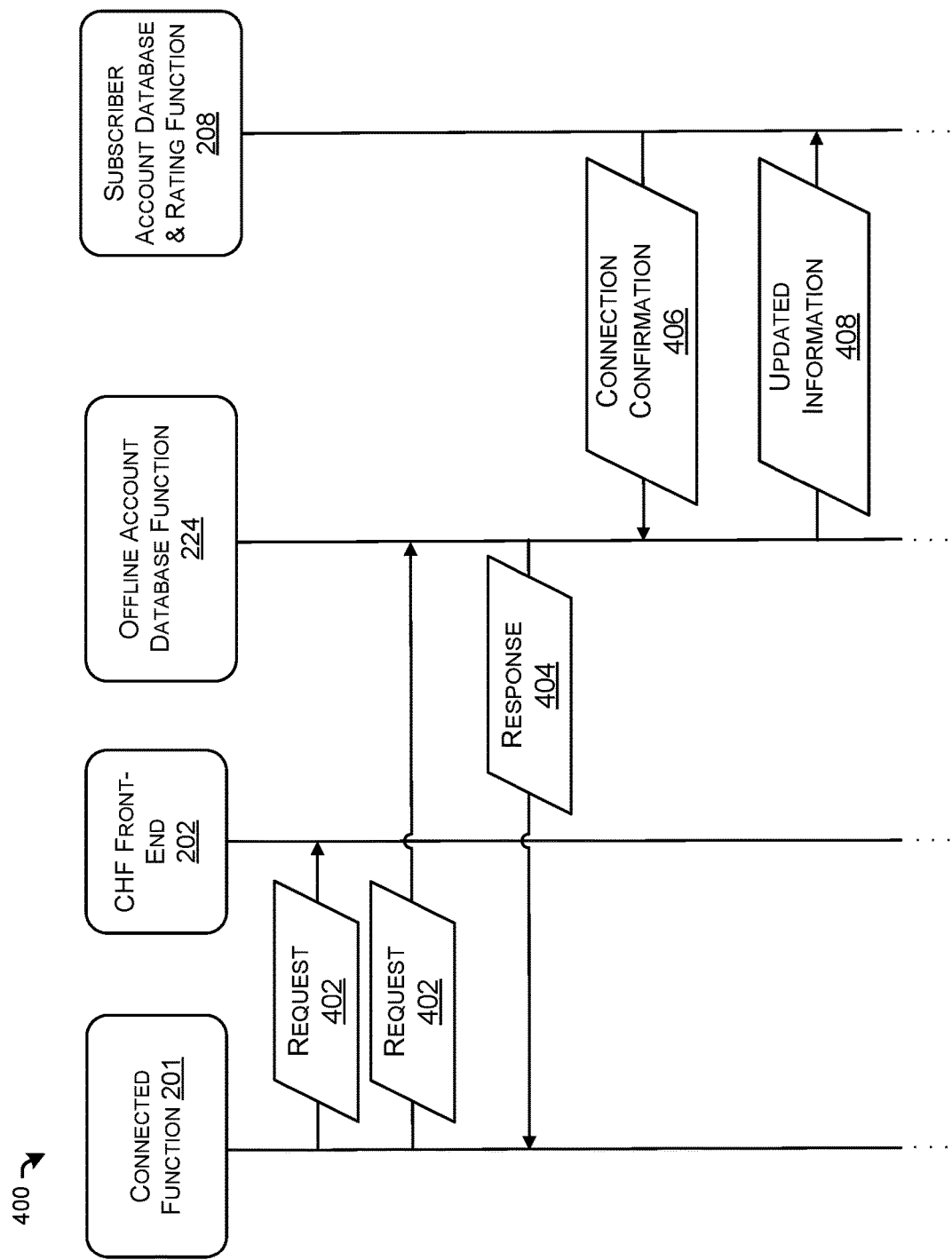
FIG. 4 illustrates example signaling for accommodating requests for subscriber information when the CHF is temporarily unreachable.

FIG. 4 illustrates example signaling 400 for accommodating requests for subscriber information when the CHF is temporarily unreachable. As shown, the signaling 400 is between the connected function 201, the CHF front-end 202, the offline database function 224, and the subscriber account database & rating function 208.

The connected function 201 may attempt to transmit a request 402 to the CHF front-end 202. In some examples, the request 402 is for subscriber information associated with a subscriber and/or session. In some cases, the request 402 is to change the subscriber information based on the session. The subscriber information may be stored within a database of a CHF that includes the CHF front-end 202. However, in various implementations, the CHF front-end 202 may be unreachable. For example, the connected function 201 may not receive a response from the CHF front-end 202 within a threshold time period after transmitting the request 402. Alternately, the connected function 201 may receive an error message from the CHF front-end 202.

Upon determining that the CHF front-end 202 is unreachable, the connected function 201 may transmit the request 402 to the offline account database function 224. Although not pictured in FIG. 2, the request 402 may be transmitted via an FOF load balancer and an FOF front-end prior to reaching the offline account database function 224. In various implementations, the offline account database function 224 may determine that the subscriber account database & rating function 208 is unreachable. For example, the offline account database function 224 may determine that an interface between the FOF and the CHF is interrupted, that a charging control node in the CHF is unreachable, that the subscriber account database & rating function 208 is unreachable, or the like. Thus, the offline account database function 224 may be unable to forward the request 402 to the CHF.

Based on the request 402, the offline account database function 224 may modify and/or access a copy of subscriber information stored by the offline account database function 224. The offline account database function 224 may generate a response 404 based on the modified and/or accessed subscriber account information. The offline account database function 224 may transmit the response 404 back to the connected function 201. For example, the offline account database function 224 may transmit the response 404 via an FOF front-end and FOF load balancer.

In various implementations, after modifying and/or accessing the copy of the subscriber information, the offline account database function 224 may determine that the CHF is reachable. For example, the offline account database function 224 may determine that an interface between the FOF and the CHF is intact, that a charging control node within the CHF is reachable, that the subscriber account database & rating function 208 is reachable, or a combination thereof. In various implementations, the offline account database function 224 may determine that the subscriber account database & rating function 208 is reachable by receiving a connection confirmation 406 from the subscriber account database & rating function 208. In various cases, the connection confirmation 406 can be any message or data that indicates the subscriber account database & rating function 208 is reachable. Although FIG. 4 indicates that the subscriber account database & rating function 208 transmits the connection confirmation 406, the connection confirmation 406 can be generated and/or transmitted by other elements of the CHF, such as a charging control node.

Based on determining that the subscriber account database & rating function 208 is reachable, the offline account database function 224 may transmit updated information 408 to the subscriber account database & rating function 208. The updated information 408 may include or otherwise indicate the copy of the subscriber information that was accessed and/or modified while the subscriber account database & rating function 208 was unreachable. For instance, the updated information 408 may indicate one or more changes to the copy of the subscriber information that occurred since the subscriber account database & rating function 208 was unreachable. Based on the updated information 408, the subscriber account database & rating function 208 may update the subscriber information stored within the subscriber account database & rating function 208 based on the subscriber activity that occurred while the subscriber account database & rating function 208 was unreachable.

Figure 5:
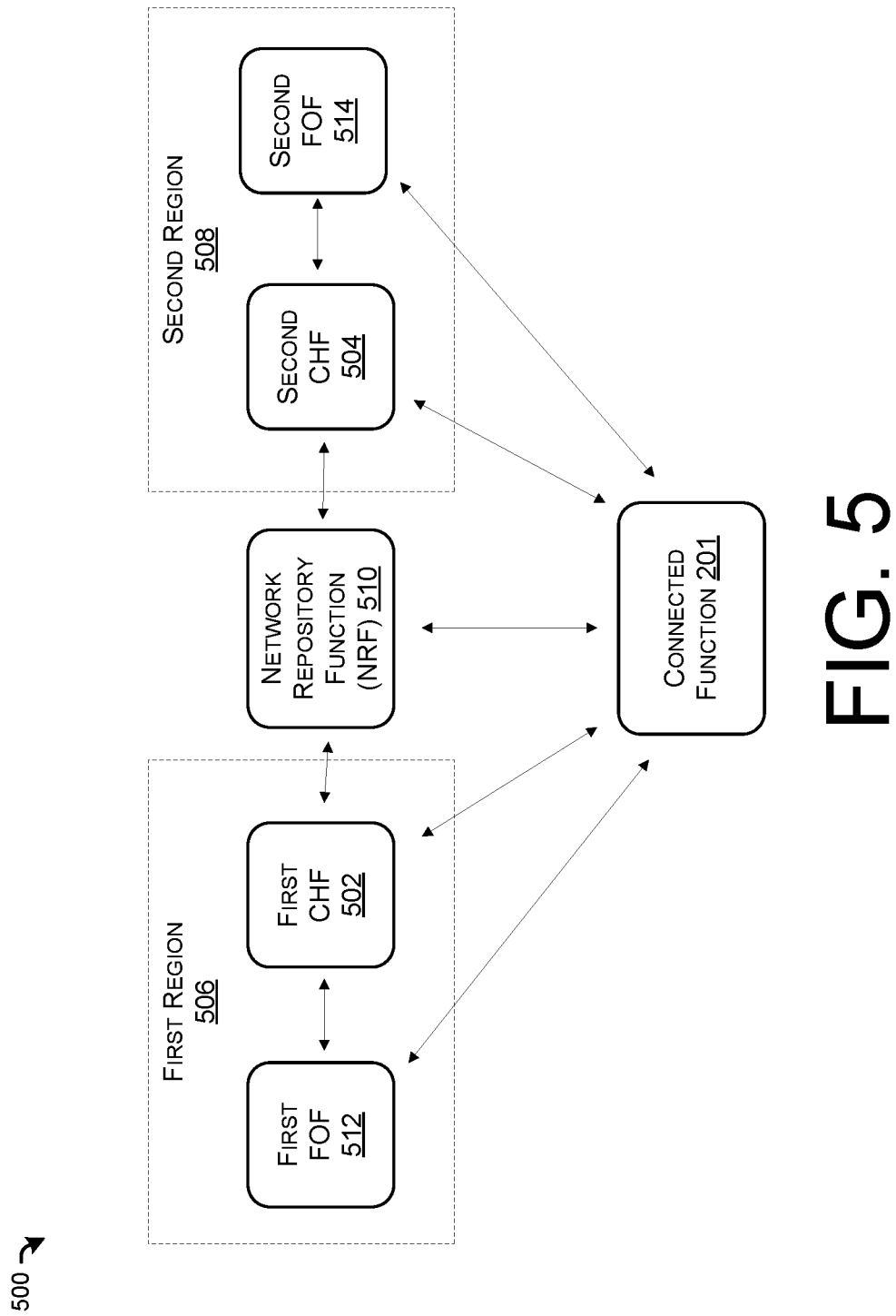
FIG. 5 illustrates an example environment including multiple CHFs and FOFs for enhanced redundancy.

FIG. 5 illustrates an example environment 500 including multiple CHFs and FOFs for enhanced redundancy. As shown, the environment 500 includes the connected function 201 described above with reference to FIGS. 2-4. In various implementations, the connected function 201 is connected to multiple CHFs including a first CHF 502 and a second CHF 504. The first CHF 502 and the second CHF 504 may be in different regions. For example, the first CHF 502 may be in a first region 506 and the second CHF 504 may be in a second region 508. The first region 506 may be defined as a first geographical area and/or at least one first data center. The second region 508 may be defined as a second geographical area and/or at least one second geographical area.

The first CHF 502 and the second CHF 504 may be connected via a Network Repository Function (NRF) 510. Although not illustrated in FIG. 1, the NRF 510 may be included in the 5GC 106. In general, the NRF 510 can be implemented as a network function including functionality to support service discovery (e.g., receive a network function discovery request and provide information associated with the discovered network function instances to a requesting entity). In some instances, the NRF 510 can receive utilization information, capability information, etc. from various network functions to provide such utilization information to the other components of a 5GC discussed herein. Further, the NRF 510 can select, assign, implement, or otherwise determine network functions to be used in the environment 500. For example, the NRF 510 may select the first CHF 502 or the second CHF 504 for establishing and/or continuing a session.

In some examples, the connected function 201 and/or the NRF 510 may determine that the first CHF 502 is unreachable. Based on this determination, the connected function 201 and/or the NRF 510 may forward requests to access and/or modify subscriber information to the second CHF 504, rather than the first CHF 502. Thus, in some cases, the second CHF 504 may serve as a fallback CHF if the first CHF 506 is unreachable.

In various implementations, the first CHF 504 and the second CHF 506 may be at least partially unreachable. For instance, the NRF 510 and/or the connected function 201 may determine that the first CHF 502 and the second CHF 504 are inaccessible. Based on this determination, the connected function 201 may transmit requests to a first FOF 512 and/or a second FOF 514. The first FOF 512 may be within the first region 506 and may be connected to the first CHF 502. The second FOF 514 may be within the second region 508 and may be connected to the second CHF 504. In cases where one of the FOFs 512 or 514 is unreachable, the connected function 201 may provide requests to the other one of the FOFs 512 or 514.

Figure 6:
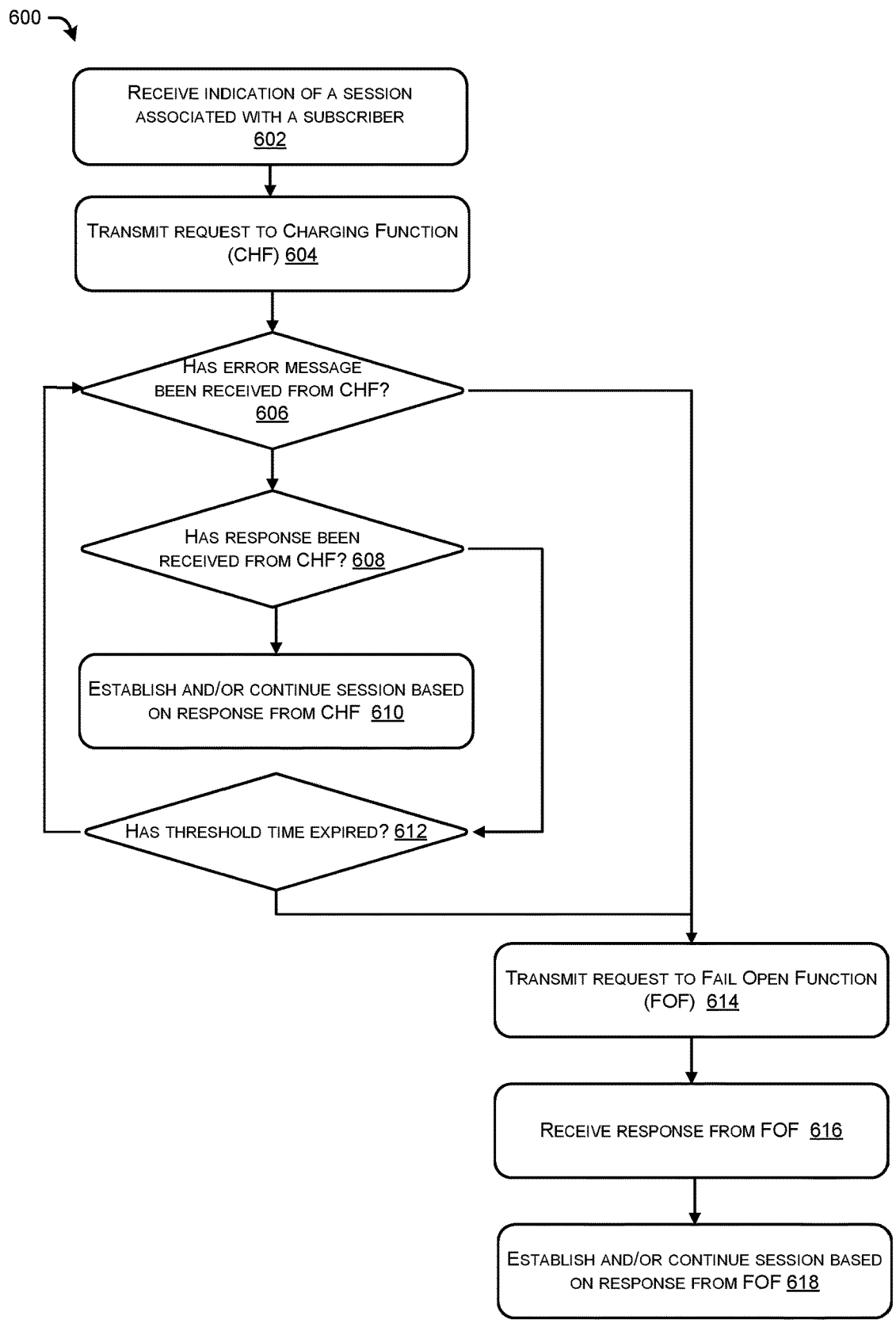
FIG. 6 illustrates an example process for establishing and/or managing a session based on charging policies.

FIG. 6 illustrates an example process 600 for establishing and/or managing a session based on charging policies. The process 600 may be performed by an entity, such as the SMF 110, the PCF 112, the connected function 201, or any combination thereof.

At 602, the entity receives an indication of a session associated with a subscriber. In some examples, the session is initiated by the subscriber. For example, a device associated with the subscriber (e.g., a "subscriber device") may transmit, to a 5GC including the entity, a request to transmit and/or receive data from an external device using the 5GC. In some implementations the session is initiated by the external device. For example, the 5GC may receive a request from an external network associated with the external device. In various implementations, the session may include an amount of data transferred between the subscriber device and the external device. In some cases, the data may be associated with a particular type of services, such as GBR services, services associated with a particular 5QI level, services associated with a particular maximum latency, or a combination thereof. In particular cases, the subscriber device may be located in a particular geographic region during the session, and the entity may receive an indication of the geographic region.

At 604, the entity transmits a request to a CHF. The request may be for at least a portion of subscriber information stored in the CHF. For example, the request may be for a limit associated with the type and/or amount of data that the subscriber device may transmit and/or receive using the 5GC. In some cases, the request may be to change at least a portion of the subscriber information stored in the CHF. For instance, the request may be to update one or more policy counters associated with the subscriber based on the session. In various implementations, the request may identify the subscriber. For instance, the request may include an IP address of the subscriber device, a unique identifier of the subscriber, or the like. In some cases, the request may identify an amount and/or type of data that is requested to be transferred in the session. In some instances, the request may indicate the geographic region in which the subscriber device is located.

At 606, the entity determines whether an error message has been received from the CHF. In some implementations, the CHF may itself identify that it is at least partially offline. For example, a front-end of the CHF may determine that one or more charging control nodes in the CHF are unreachable. In various cases, the CHF front-end may generate and transmit an error message to the entity. The error message may indicate that the CHF is at least temporarily unreachable. However, in examples in which the CHF is completely unreachable, the front-end of the CHF may be unable to receive the request from the entity and/or generate the error message.

If the entity determines that the error message has not been received at 606, then the process 600 proceeds to 608. At 608, the entity determines whether a response has been received from the CHF. For example, if the CHF is operating without interruptions, the CHF may receive the request and access and/or modify subscriber information stored in the CHF based on the request. In addition, the CHF may generate and transmit (to the entity) a response based on the accessed and/or modified subscriber information.

If the entity determines that the response has been received from the CHF at 608, then the process continues to 610. At 610, the entity establishes and/or continues the session based on the response from the CHF. In various implementations, the entity may select a UPF for the session based on the subscriber information. In some cases, the entity may cause the UPF to enforce certain policies on the data transferred in the session based on the subscriber information. For instance, if the subscriber information indicates that the subscriber is not permitted to receive and/or transmit data associated with a particular 5QI (e.g., URLLC data), then the entity may cause the UPF to deliver data in the session using a different QCI (e.g., at a higher maximum latency than required for URLLC data).

If, on the other hand, the entity determines that the response has not been received from the CHF at 608, then the process continues to 612. At 612, the entity determines whether a threshold time has expired. In cases, for example, where the CHF is completely offline or otherwise unreachable by the entity, the CHF may be unable to receive the request from the entity and/or generate a response to the request. To prevent the entity from waiting for the response, indefinitely, from the CHF, the entity may determine whether the request and/or the response is timed out.

If the entity determines that the threshold time has not expired at 612, then the process returns to 606. However, if the entity determines that the error message has been received from the CHF at 606, or the entity determines that the threshold time has expired at 612, then the process 600 continue at 614. At 614, the entity transmits the request to an FOF. The FOF may be different than the CHF. For example, the FOF may be implemented by one or more first computing devices, the CHF may be implemented by one or more second computing devices, and the first computing device(s) may be different than the second computing device(s). In some implementations, the entity may communicate with the FOF over a first communications interface, with the CHF over a second communications interface, and the first communications interface may be different than the second communications interface. Accordingly, the FOF may be reachable even if the CHF is unreachable.

The FOF may store a copy of the subscriber information. In some cases, the FOF may access and/or modify the copy of the subscriber information based on the request from the entity. Furthermore, the FOF may be configured to generate a response based on the accessed and/or modified copy of the subscriber information stored in the FOF. In some implementations, the FOF may be able to reach at least a portion of the CHF over a third communications interface, even though the entity may be unable to reach the CHF. The FOF may forward the request from the entity to the CHF, which may access and/or modify the copy of the subscriber information stored in the CHF. The CHF may generate a response based on the accessed and/or modified subscriber information and return the response to the FOF.

At 616, the entity receives a response from the FOF. The response, for example, may originate from the FOF or the CHF.

At 618, the entity establishes and/or continues the session based on the response from the FOF. For example, the entity may enforce a policy for the policy based on the subscriber information. In some cases, the entity may select a UPF to deliver data in the session based on the subscriber information. In some implementations, the entity may enforce limits (e.g., latency limits, data limits, etc.) on data transferred in the session based on the subscriber information.

Figure 7:
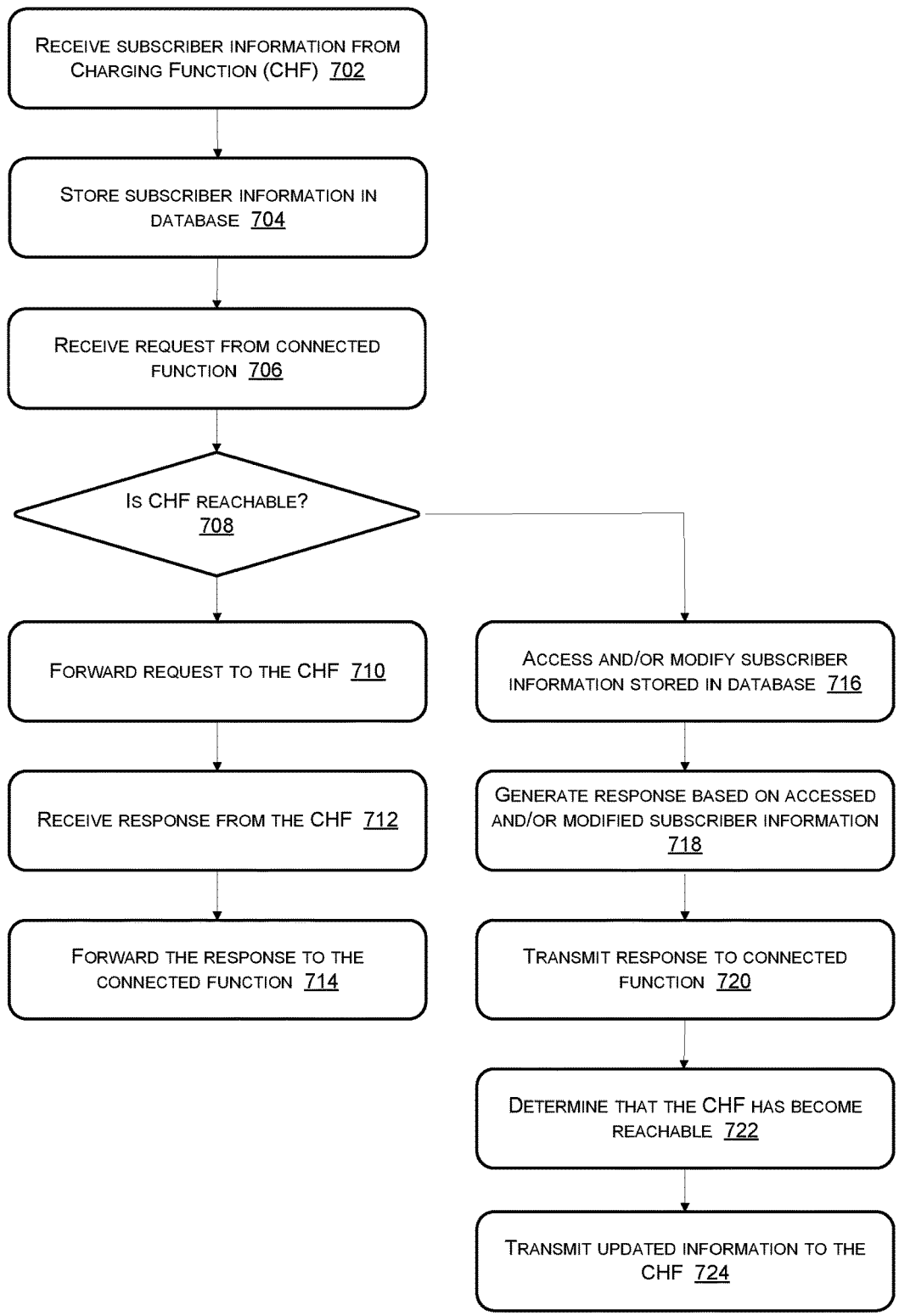
FIG. 7 illustrates an example process for accommodating requests when a CHF is unreachable and updating the CHF when the CHF becomes reachable.

FIG. 7 illustrates an example process 700 for accommodating requests when a CHF is unreachable and updating the CHF when the CHF becomes reachable. The process 700 can be performed by an entity, such as the FOF 124, the first FOF 512, the second FOF 514, or any combination thereof.

At 702, the entity may receive subscriber information from a CHF. The subscriber information, in various implementations, may include data indicative of limits on usage of a network by a subscriber and/or usage of the network by the subscriber. For instance, the subscriber information may include an amount and/or type of services that the subscriber is permitted to transmit and/or receive using at least one network (e.g., a 5GC) in accordance with the subscriber's plan. In some examples, the subscriber information may indicate a remaining amount of services and/or a total amount of services that the subscriber can transmit and/or receive using network(s). For instance, the amount of services may be an amount of data (e.g., in gigabytes (GB) or some other data measurement) traversing the network(s), a number of sessions delivered using the network(s), or the like. In various implementations, the type of services may include at least one of a QoS of the services, a latency of the services, a bandwidth allotted to the services, or a slice type (SST) of the services. In some cases, the subscriber information may indicate whether the subscriber is permitted to transmit and/or receive GBR services using the network(s).

According to some implementations, the subscriber information may indicate usage-based limits and/or surcharges associated with the subscriber. For example, the subscriber information may indicate that a device associated with the subscriber is allowed to transmit and/or receive an amount and/or type of services when the device is located in a certain geographical region (e.g., a cell area), but that the device is allowed to transmit and/or receive a different amount and/or type of services when the device is located outside of the certain geographical region (e.g., in a roaming region). In some cases, the subscriber information may limit an amount and/or type of services that the device is permitted to transmit and/or receive using the network(s). In some instances, the subscriber information may indicate that the subscriber incurs additional charges (e.g., surcharges) if the device transmits and/or receives greater than a threshold amount, or one or more specific types, of services using the network(s).

In some cases, the subscriber information may be associated with quota management. For example, the device may be associated with a threshold amount of services (e.g., a threshold number of sessions, a threshold amount of data, etc.) that the device is allowed to consume. The subscriber information may include an indication of the threshold associated with the device. In some cases, the subscriber information may indicate an amount of services (e.g., a number of sessions, an amount of data transmitted to and/or from the device, etc.) that the device has consumed. In particular examples, the subscriber information may include one or more policy counters.

The CHF may store the subscriber information and provide a copy of the subscriber information to the entity performing the process 700. In some examples, the CHF may transmit updated versions of the subscriber information to the entity multiple times, such as at a particular frequency (e.g., every 48 hours).

At 704, the entity may store subscriber information in a database. The entity may be implemented by one or more first computing devices, the CHF may be implemented by one or more second computing devices, and the first computing device(s) may be different than the second computing device(s). The entity may store the copy of the subscriber information in a different database than the database in which the CHF stores the other copy of the subscriber information.

At 706, the entity may receive a request from a connected function. In various cases, the connected function may be an SMF and/or a PCF. The entity may receive the request over a communication interface that is different than a communication interface in which the entity receives the subscriber information from the CHF. The request may be for access and/or modification of the subscriber information. For example, the request may indicate an identity of the subscriber (e.g., an IP address of the subscriber), details about a session associated with the subscriber (e.g., a type of services to be transferred in the session, an amount of data that has been already transferred in the session, etc.), a location of the subscriber's device (e.g., in a particular cell region associated with the carrier or outside of the carrier's region), etc.

At 708, the entity may determine whether the CHF is reachable. For example, the entity may receive a message from the CHF over the interface connecting the CHF and the entity. In some cases, the entity may attempt to forward the request to the CHF. If the entity does not receive a response from the CHF within a predetermined time period of sending the request, or the entity receives an error message from the CHF, then the entity may conclude that the CHF is unreachable.

If the entity determines that the CHF is reachable at 708, then the process 700 proceeds to 710. At 710, the entity may forward the request to the CHF. At 712, the entity may receive a response from the CHF. For example, the response may indicate that the copy of the subscriber information stored by the CHF has been accessed and/or modified in accordance with the request. For instance, the response may include at least a portion of the subscriber information. At 714, the entity may forward the response to the connected function.

If, on the other hand, the entity determines that the CHF is not reachable at 710, then the process 700 proceeds to 716. At 716, the entity accesses and/or modifies the copy of the subscriber information stored in the database based on the request. At 718, the entity generates a response based on the accessed and/or modified subscriber information. In some examples, the response includes at least a portion of the copy of the subscriber information stored by the entity. At 720, the entity transmits the response to the connected function.

At 722, the entity may determine that the CHF has become reachable. For example, the CHF may have been temporarily offline or otherwise unreachable by the entity. In various implementations, the entity may determine that the CHF has become reachable by receiving a message from the CHF.

At 724, the entity may transmit updated information to the CHF. In various implementations, the copy of the subscriber information stored by the entity was modified while the CHF was unreachable. For example, a policy counter indicating an amount of data remaining in a plan of the subscriber may have been decreased based on a session that occurred while the CHF was unreachable. In some cases, the copy of the subscriber information was modified at 716. The updated information may indicate one or more changes to the copy of the subscriber information that occurred while the CHF was unreachable. Accordingly, the CHF may reconcile its own copy of the subscriber information based on the activity of the subscriber that occurred while the CHF was unreachable.

Figure 8:
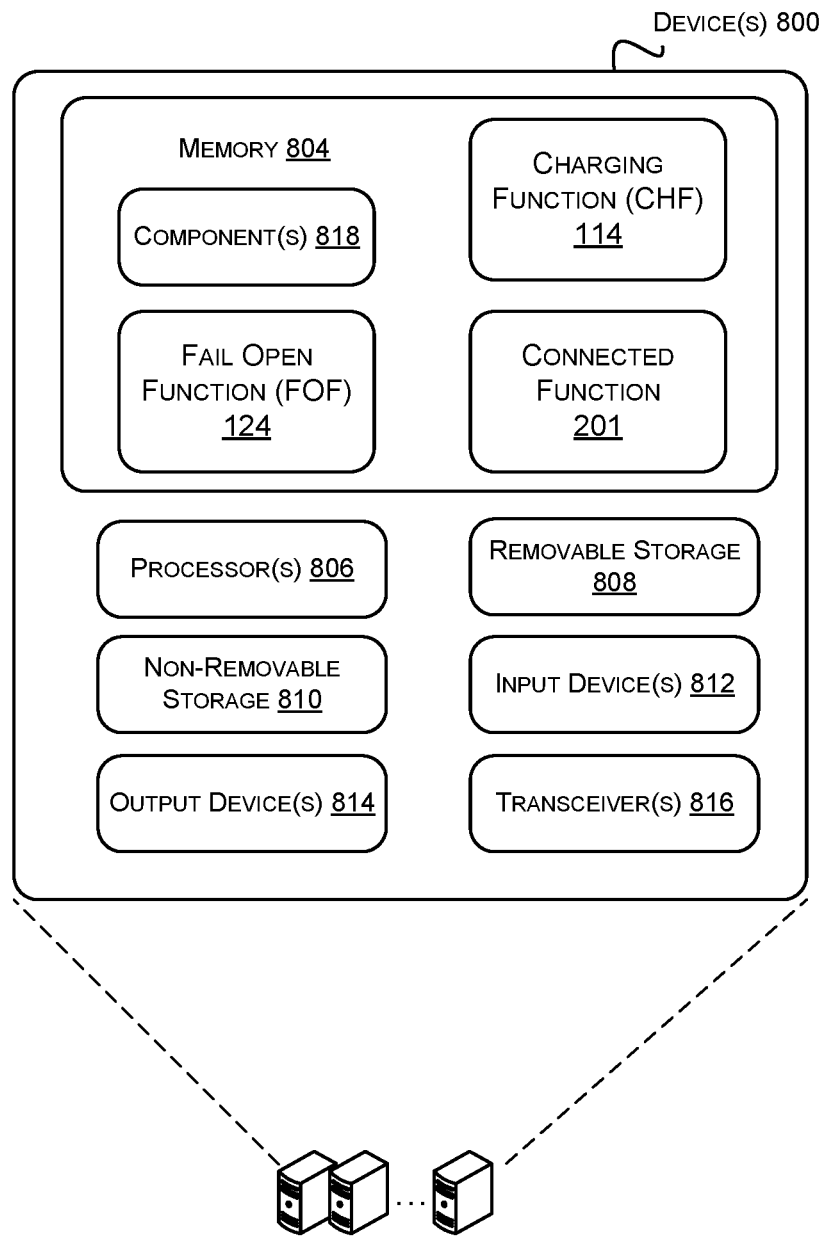
FIG. 8 illustrates an example of at least one device configured to perform various methods and functions described herein.

FIG. 8 illustrates an example of at least one device 800 configured to perform various methods and functions described herein. The device(s) 800 includes any of memory 804, processor(s) 806, removable storage 808, non-removable storage 810, input device(s) 812, output device(s) 814, and transceiver(s) 816.

The memory 804 may include component(s) 818. The component(s) 818 may include at least one of instruction(s), program(s), database(s), software, operating system(s), etc. In some implementations, the component(s) 818 include instructions that are executed by processor(s) 806 and/or other components of the device 800. In addition, the memory 804 may store instructions for performing operations of the CHF 114, the FOF 124, the connected function 201, or any combination thereof. Although not illustrated in FIG. 8, the memory 804 may also store a compatible device Operating System (OS), including but not limited to, Microsoft Windows Mobile, Google Android, Apple iOS, Linux Mobile, as well as any other common mobile device OS.

In some embodiments, the processor(s) 806 include a central processing unit (CPU), a graphics processing unit (GPU), or both CPU and GPU, or other processing unit or component known in the art. The processor(s) 806 may be configured to execute instructions stored in the memory 804.

The device 800 may also include additional data storage devices (removable and/or non-removable) such as, for example, magnetic disks, optical disks, or tape. Such additional storage is illustrated in FIG. 8 by removable storage 808 and non-removable storage 810. Tangible computer-readable media can include volatile and non-volatile, removable and non-removable media implemented in any method or technology for storage of information, such as computer readable instructions, data structures, program modules, or other data. The memory 804, the removable storage 808, and the non-removable storage 810 are all examples of computer-readable storage media. Computer-readable storage media include, but are not limited to, Random Access Memory (RAM), Read-Only Memory (ROM), Electrically Erasable Programmable Read-Only Memory (EEPROM), flash memory, or other memory technology, Compact Disk Read-Only Memory (CD-ROM), Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device 800. Any such tangible computer-readable media can be part of the device 800.

The device 800 also can include input device(s) 812, such as a keypad, a cursor control, a touch-sensitive display, voice input device, etc., and output device(s) 814 such as a display, speakers, printers, etc. These devices are well known in the art and need not be discussed at length here.

As illustrated in FIG. 8, the device 800 also includes one or more wired or wireless transceiver(s) 816. For example, the transceiver(s) 816 can include a network interface card (NIC), a network adapter, a Local Area Network (LAN) adapter, or a physical, virtual, or logical address to connect to various network components, for example. To increase throughput when exchanging wireless data, the transceiver(s) 816 can utilize multiple-input/multiple-output (MIMO) technology. The transceiver(s) 816 can comprise any sort of wireless transceivers capable of engaging in wireless, radio frequency (RF) communication. The transceiver(s) 816 can also include other wireless modems, such as a modem for engaging in Wi-Fi, WiMAX, Bluetooth, infrared communication, and the like. The transceiver(s) 816 may include transmitter(s), receiver(s), or both.

EXAMPLE CLAUSES

While the example clauses described above are described with respect to one particular implementation, it should be understood that, in the context of this document, the content of the example clauses can also be implemented via a method, device, system, a computer-readable medium, and/or another implementation.

1. A Fail Open Function (FOF) including: one or more processors; a memory including a database; and one or more components stored in the memory and executable by the one or more processors to perform operations including: receiving, from a session management function (SMF), a request for information about a subscriber associated with a session; determining that a charging function (CHF) is unreachable; based on determining that the CHF is unreachable: retrieving the information about the subscriber from an entry in the database, the entry corresponding to the subscriber; returning, to the SMF, the information about the subscriber; and updating the entry of the database based on the session; determining that a charging function (CHF) has become reachable; and based on determining that the CHF has become reachable, transmitting, to the CHF, an indication of the entry that has been updated.

2. The FOF of clause 1, wherein the operations further include: receiving, from the CHF, an indication of a change to the information about the subscriber; and updating the entry based on the indication of the change to the information about the subscriber.

3. The FOF of clause 1 or 2, wherein determining that the CHF is unreachable includes: transmitting the request toward the CHF; and receiving an error message or determining that a threshold time after transmitting the request has expired without receiving a response from the CHF.

4. A method including: receiving, from a charging function (CHF), information corresponding to a subscriber of a network; storing the information in a database; receiving, from the CHF or a connected function, a request corresponding to the subscriber; based on the request, performing at least one of accessing or modifying the information stored in the database; based on performing at least one of accessing or modifying the information stored in the database, generating a response; and transmitting the response to the CHF or the connected function.

5. The method of clause 4, wherein the request is received from the connected function, wherein the response is transmitted to the connected function, and wherein the connected function includes at least one of a session management function (SMF) or a policy control function (PCF).

6. The method of clause 4 or 5, further including: determining that the CHF is unreachable; determining that the CHF has become reachable; and based on determining that the CHF has become reachable, transmitting, to the CHF, an indication of the information that has been at least one of accessed or modified, wherein performing at least one of accessing or modifying the information stored in the database is based on determining that the CHF is unreachable.

7. The method of clause 6, wherein determining that the CHF is unreachable includes determining that an interface between the CHF and an entity performing the method is disconnected.

8. The method of clause 6 or 7, wherein determining that the CHF has become reachable includes receiving a message from the CHF.

9. The method of any one of clauses 4 to 8, wherein the method is performed by at least one first server, wherein the CHF is implemented by at least one second server, and wherein the at least one first server is different than the at least one second server.

10. The method of any one of clauses 4 to 9, wherein the method is performed by a Fail-Open Function (FOF) that is connected to the connected function by a first interface, and wherein the FOF is connected to the CHF by a second interface, the second interface being different than the first interface.

11. The method of any one of clauses 4 to 10, wherein the request corresponding to the subscriber indicates a session associated with the subscriber, the session including data that is at least one of transmitted or received by a device associated with the subscriber, and wherein performing at least one of accessing or modifying the information stored in the database includes modifying the information based on at least one of an amount of the data or a type of the data.

12. The method of any one of clauses 4 to 11, wherein the information stored in the database includes at least one of an amount of data, a number of sessions, or a type of services that a device associated with the subscriber is permitted to transmit and/or receive over a $5^{th}$ Generation Core (5GC), the 5GC including the CHF and the connected function.

13. A system including: at least one processor; and memory including a database and storing instructions that, when executed by the at least one processor, cause the at least one processor to perform operations including: receiving, from a charging function (CHF), information corresponding to a subscriber of a network; storing the information in the database; receiving, from the CHF or a connected function, a request corresponding to the subscriber; based on the request, performing at least one of accessing or modifying the information stored in the database; based on performing at least one of accessing or modifying the information stored in the database, generating a response; and transmitting the response to the CHF or the connected function.

14. The system of clause 13, wherein the request is received from the connected function, wherein the response is transmitted to the connected function, and wherein the connected function includes at least one of a session management function (SMF) or a policy control function (PCF).

15. The system of clause 13 or 14, wherein the operations further include: determining that the CHF is unreachable; determining that the CHF has become reachable; and based on determining that the CHF has become reachable, transmitting, to the CHF, an indication of the information that has been at least one of accessed or modified, wherein performing at least one of accessing or modifying the information stored in the database is based on determining that the CHF is unreachable.

16. The system of clause 15, wherein determining that the CHF is unreachable includes determining that an interface between the CHF and an entity performing the method is disconnected.

17. The system of clause 15 or 16, wherein determining that the CHF has become reachable includes receiving a message from the CHF.

18. The system of any one of clauses 13 to 17, wherein the at least one processor is at least one first processor and the memory is first memory, wherein the CHF includes second memory and at least one second processor, wherein the at least first processor is different than the at least one second processor, and wherein the first memory is different than the second memory.

19. The system of any one of clauses 13 to 18, wherein the system is connected to the connected function by a first interface, and wherein the FOF is connected to the CHF by a second interface, the second interface being different than the first interface.

20. The system of any one of clauses 13 to 19, wherein the request corresponding to the subscriber indicates a session associated with the subscriber, the session including data that is at least one of transmitted or received by a device associated with the subscriber, and wherein performing at least one of accessing or modifying the information stored in the database includes modifying the information based on at least one of an amount of the data or a type of the data.

CONCLUSION

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A Fail Open Function (FOF) comprising:
one or more processors;
a memory comprising a database; and
one or more components stored in the memory and executable by the one or more processors to perform operations comprising:
   receiving, from a session management function (SMF) or a policy control function (PCF), a request for information about a subscriber associated with a session;
   determining that a charging function (CHF) is unreachable;
   based on determining that the CHF is unreachable:
      retrieving the information about the subscriber from an entry in the database, the entry corresponding to the subscriber;
      returning, to the SMF or PCF, the information about the subscriber; and
      updating the entry of the database based on the session;
   determining that a charging function (CHF) has become reachable; and
   based on determining that the CHF has become reachable, transmitting, to the CHF, an indication of the entry that has been updated.

2. The FOF of claim 1, wherein the operations further comprise:
receiving, from the CHF, an indication of a change to the information about the subscriber; and
updating the entry based on the indication of the change to the information about the subscriber.

3. The FOF of claim 1, wherein determining that the CHF is unreachable comprises:
transmitting the request toward the CHF; and
receiving an error message or determining that a threshold time after transmitting the request has expired without receiving a response from the CHF.

4. The FOF of claim 1, wherein the FOF is implemented by at least one first server,
wherein the CHF is implemented by at least one second server, and
wherein the at least one first server is different than the at least one second server.

5. The FOF of claim 1, wherein the request corresponding to the subscriber indicates a session associated with the subscriber, the session comprising data that is at least one of transmitted or received by a device associated with the subscriber, and
wherein performing the retrieving of the information stored in the database comprises modifying the information based on at least one of an amount of the data or a type of the data.

6. The FOF of claim 1, wherein the information stored in the database comprises at least one of an amount of data, a number of sessions, or a type of services that a device associated with the subscriber is permitted to transmit and/or receive over a $5^{th}$ Generation Core (5GC), the 5GC comprising the CHF and the SMF or PCF.

7. A non-transitory computer-readable medium having stored thereon a plurality of programming instructions that, when executed by a processor of a Fail Open Function (FOF) cause the FOF to perform operations comprising:
receiving, from a session management function (SMF) or a policy control function (PCF), a request for information about a subscriber associated with a session;
determining that a charging function (CHF) is unreachable;
based on determining that the CHF is unreachable:
   retrieving the information about the subscriber from an entry in a database associated with the FOF, the entry corresponding to the subscriber;
   returning, to the SMF or PCF, the information about the subscriber; and
   updating the entry of the database based on the session;
determining that a charging function (CHF) has become reachable; and
based on determining that the CHF has become reachable, transmitting, to the CHF, an indication of the entry that has been updated.

8. The non-transitory computer-readable medium of claim 7, wherein the operations further comprise:
receiving, from the CHF, an indication of a change to the information about the subscriber; and
updating the entry based on the indication of the change to the information about the subscriber.

9. The non-transitory computer-readable medium of claim 7, wherein determining that the CHF is unreachable comprises:
transmitting the request toward the CHF; and
receiving an error message or determining that a threshold time after transmitting the request has expired without receiving a response from the CHF.

10. The non-transitory computer-readable medium of claim 7, wherein the FOF is implemented by at least one first server,
wherein the CHF is implemented by at least one second server, and
wherein the at least one first server is different than the at least one second server.

11. The non-transitory computer-readable medium of claim 7, wherein the request corresponding to the subscriber indicates a session associated with the subscriber, the session comprising data that is at least one of transmitted or received by a device associated with the subscriber, and
wherein performing the retrieving of the information stored in the database comprises modifying the information based on at least one of an amount of the data or a type of the data.

12. The non-transitory computer-readable medium of claim 7, wherein the information stored in the database comprises at least one of an amount of data, a number of sessions, or a type of services that a device associated with the subscriber is permitted to transmit and/or receive over a 5th Generation Core (5GC), the 5GC comprising the CHF and the SMF or PCF.

13. A system comprising:
one or more processors;
a memory comprising a database; and
one or more components stored in the memory and executable by the one or more processors to perform operations comprising:
  receiving, from a session management function (SMF) or a policy control function (PCF), a request for information about a subscriber associated with a session;
  determining that a charging function (CHF) is unreachable;
  based on determining that the CHF is unreachable:
    retrieving the information about the subscriber from an entry in the database, the entry corresponding to the subscriber;
    returning, to the SMF or PCF, the information about the subscriber; and
    updating the entry of the database based on the session;
  determining that a charging function (CHF) has become reachable; and
  based on determining that the CHF has become reachable, transmitting, to the CHF, an indication of the entry that has been updated.

14. The system of claim 13, wherein the operations further comprise:
  receiving, from the CHF, an indication of a change to the information about the subscriber; and
  updating the entry based on the indication of the change to the information about the subscriber.

15. The system of claim 13, wherein determining that the CHF is unreachable comprises:
  transmitting the request toward the CHF; and
  receiving an error message or determining that a threshold time after transmitting the request has expired without receiving a response from the CHF.

16. The system of claim 13, wherein the system includes at least one first server,
  wherein the CHF is implemented by at least one second server, and
  wherein the at least one first server is different than the at least one second server.

17. The system of claim 13, wherein the request corresponding to the subscriber indicates a session associated with the subscriber, the session comprising data that is at least one of transmitted or received by a device associated with the subscriber, and
  wherein performing the retrieving of the information stored in the database comprises modifying the information based on at least one of an amount of the data or a type of the data.

18. The system of claim 13, wherein the information stored in the database comprises at least an amount of data.

19. The system of claim 13, wherein the information stored in the database comprises at least a type of services that a device associated with the subscriber is permitted to transmit and/or receive over a $5^{th}$ Generation Core (5GC), the 5GC comprising the CHF and the SMF or PCF.

20. The system of claim 13, wherein the information stored in the database comprises at least a number of sessions.

* * * * *